(12) United States Patent
Huang

(10) Patent No.: US 7,225,677 B2
(45) Date of Patent: Jun. 5, 2007

(54) PRESSURE GAUGE

(76) Inventor: Ying-Che Huang, No. 111, Lane Tzengfu, Taengtsuo Tsuen, Shioushuei Shiang, Changhua (TW)

( * ) Notice: Subject to any disclaimer, the term of this patent is extended or adjusted under 35 U.S.C. 154(b) by 15 days.

(21) Appl. No.: 11/136,407

(22) Filed: May 25, 2005

(65) Prior Publication Data

US 2006/0277988 A1   Dec. 14, 2006

(51) Int. Cl.
*G01L 7/00* (2006.01)
(52) U.S. Cl. ....................................................... 73/700
(58) Field of Classification Search ............... 73/146.5, 73/700; 152/416
See application file for complete search history.

(56) References Cited

U.S. PATENT DOCUMENTS 5,465,772 A * 11/1995 Sartor ......................... 152/416
5,505,080 A * 4/1996 McGhee ..................... 73/146.5
5,618,361 A * 4/1997 Colussi et al. ............... 152/416
5,665,908 A * 9/1997 Burkey et al. ............. 73/146.8
5,713,390 A * 2/1998 Huang .......................... 137/539
6,744,356 B2 * 6/2004 Hamilton et al. ........... 340/444
7,040,152 B2 * 5/2006 Rutherford ................... 73/146
2002/0108434 A1 * 8/2002 Ziarati .......................... 73/146
2004/0007302 A1 * 1/2004 Hamilton et al. ........... 152/416

* cited by examiner

*Primary Examiner*—Andre J. Allen
(74) *Attorney, Agent, or Firm*—Birch, Stewart, Kolasch & Birch, LLP

(57) ABSTRACT

Disclosed is a pressure gauge including a body forming an inlet, an outlet, and a shunt hole. A pressure meter is provided to the shunt hole. An inlet duct in connection with an inflation device is provided to the inlet. A check valve is arranged in the inlet duct. An outlet duct is connected to the outlet and is prepared with an inflation mouth for coupling with an intake nozzle of an object to be inflated. When an inflation device is operated to charge air into an object for inflation through the inlet duct, the body, and the outlet duct, a pressure measuring process can be performed concurrently.

5 Claims, 9 Drawing Sheets

PRESSURE GAUGE

BACKGROUND OF THE INVENTION

1. Field of the Invention

The present invention relates to a pressure gauge capable of measuring pressure and charging air concurrently.

2. Prior Arts

A pressure gauge for measuring tire pressure is so far equipped with an intake nozzle at the gauge casing so that the intake nozzle can be sleeve-jointed with an air-charge inlet of tire such that air is forced to enter the gauge casing for measuring the inside pressure value after an valve of the air-charge inlet has been opened by the intake nozzle. However, in the case of an over-high or insufficient tire pressure, the pressure gauge must be unloaded for discharging or recharging air, and the pressure gauge is reloaded for measuring pressure again. Before a premium condition is found, this action may have to be repeated several times that would inevitably trouble a user more or less.

SUMMARY OF THE INVENTION

Since a conventional pressure gauge is designed for measuring the pressure inside a ball or a wheel tire only, it cannot inflate or deflate the object in the meanwhile, therefore, a user may have to measure, inflate and/or deflate a wheel tire many times until a satisfactory pressure is achieved.

A first feature of the present invention is to combine a body with a pressure meter, an inlet duct, and an outlet duct. When air is pumped into the body through the inlet duct then through the outlet duct to inflate an object, the air is meanwhile shunted to enter the pressure meter to thereby achieve the purpose of measuring pressure during inflation.

A second feature of the present invention is to arrange a check valve adjacent to the entrance of the inlet duct such that an external force can be applied to the check valve to discharge inside air and reduce air pressure accordingly in case the pressure meter detects an over-high pressure.

A feature of the present invention is that either a needle-style or an upright cylinder-style pressure meter may be assembled to the body of the present invention according to practical requirements.

According to a first technical aspect of the present invention, a body is interconnected with an inlet, an outlet, and a shunt hole; a pressure meter is provided to the shunt hole; an inlet duct having a check valve is coupled with the inlet; an outlet duct having an outlet is connected with the outlet such that air can be charged into the body by a pump device to rush into the outlet duct and meanwhile into the pressure meter for measuring the pressure thereof.

According to a second technical aspect of the present invention, an upright cylinder-style pressure meter having a cylindrical body, a spring, and a piston cylinder, is provided. The cylindrical body is composed of a window and a through hole, where the through hole is connected with the shunt hole of the body. The spring is disposed in the cylindrical body. The piston cylinder is also placed in the cylindrical body such that the spring is located between the piston cylinder and one end of the cylindrical body. Pressure scales are marked on the surface of the piston cylinder so that air can be charged into the body by a pump device to rush into the outlet duct and meanwhile into the pressure meter for measuring the pressure thereof.

According to a third technical aspect of the present invention, a check valve arranged in the inlet duct comprises a first cavity and a connected second cavity. The first cavity has a first through hole. The second cavity has a third through hole. A second through hole is arranged between the first and the second cavity. The through holes are aligned in a straight line. A shaft extends through the first, second, and third through holes. Opposite ends of the shaft are provided respectively with a first flange corresponding to the first through hole and a valve corresponding to the third through hole. The shaft has a second flange inside the second cavity, and a spring is arranged between the second flange and an inner wall surface of the second cavity.

According to a fourth technical aspect of the present invention, a dust cover is provided for being locked on the entrance of the inlet duct for preventing dust from choking the inlet duct during out of use; and one end of the dust cover is further formed of a pointing end, whereby an external force may be applied to the valve of the inlet duct to allow the air inside an inflated object to be discharged through the valve.

In short, compared with a conventional pressure meter, the pressure gauge of the present invention is more advantageous in measuring pressure of a wheel tire for example, because air charge or discharge can be performed during the measuring process.

For more detailed information regarding advantages or features of the present invention, at least one example of preferred embodiment will be described below with reference to the annexed drawings.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

Figure 1:
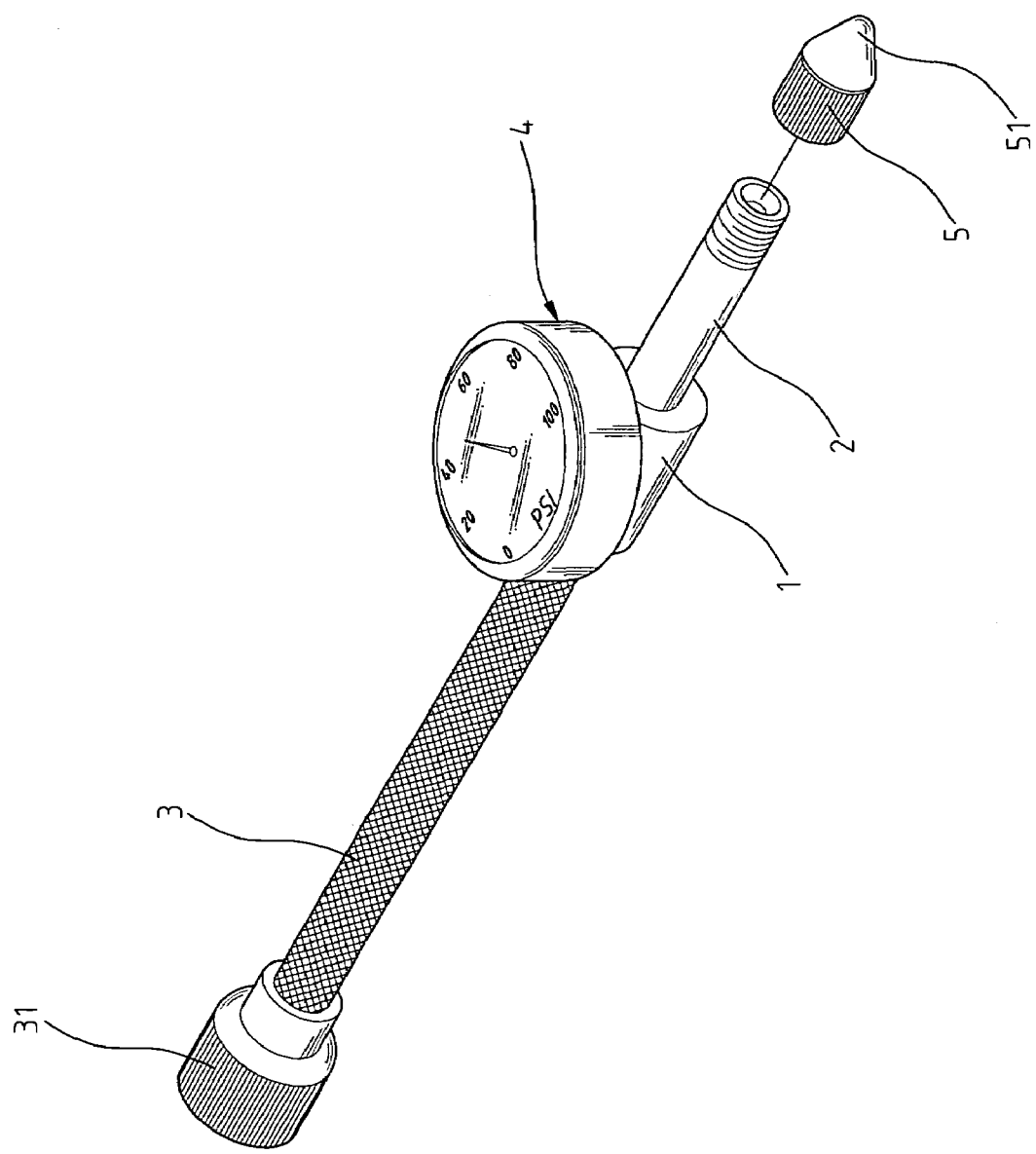
FIG. 1 is a perspective view of a first embodiment of the present invention.
Figure 2:
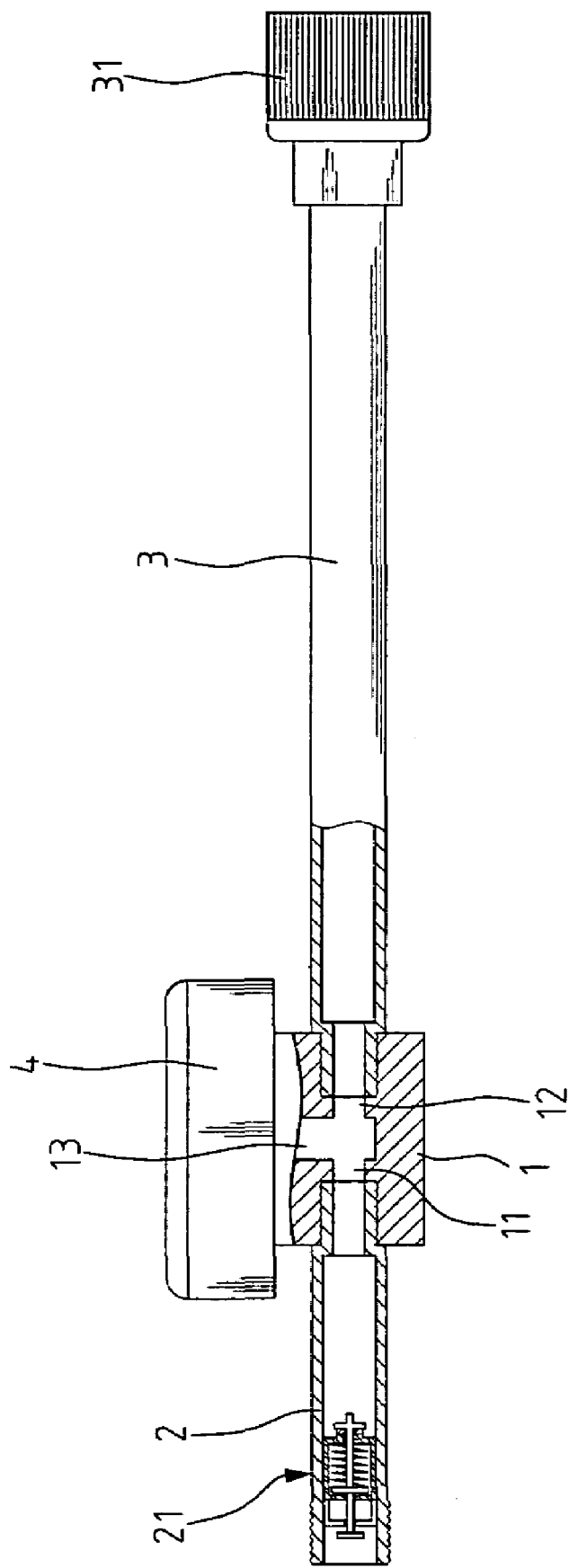
FIG. 2 is a sectional plane view of the first embodiment of the present invention.
Figure 9:
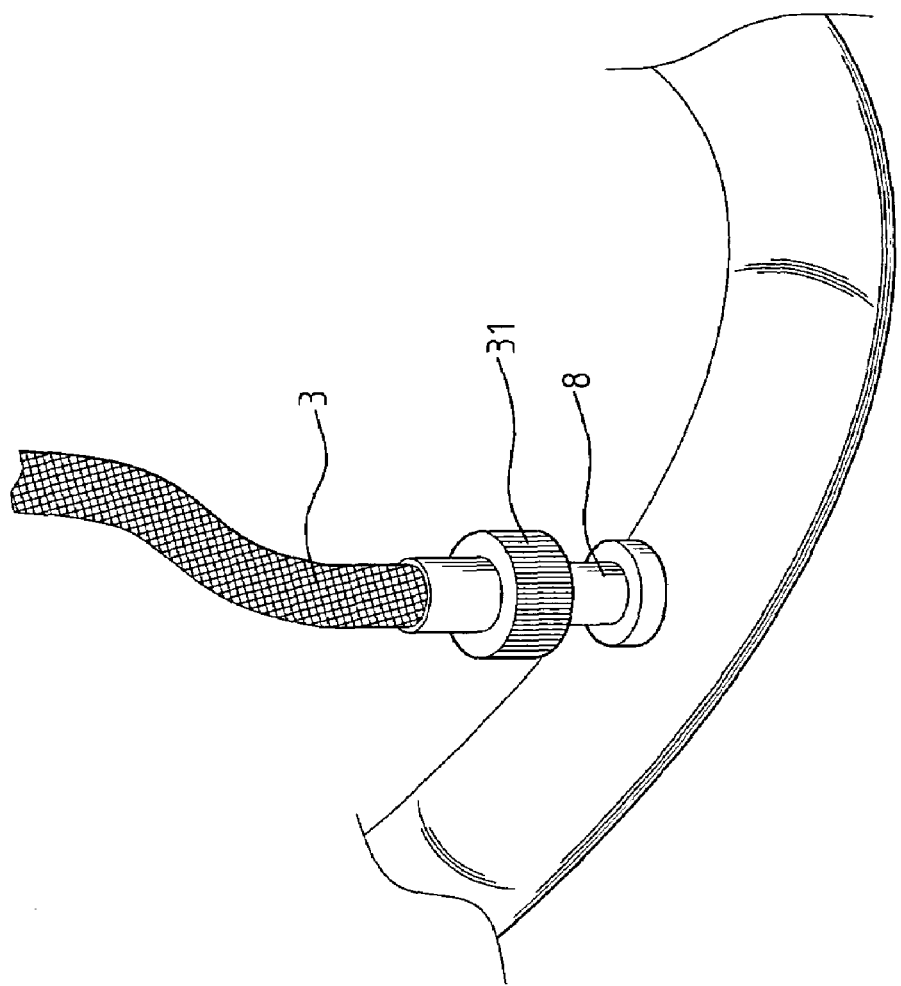
FIG. 9 is a perspective view showing that air is charged from a nozzle to an air inlet of a wheel tire.

In a first embodiment shown in FIGS. 1 and 2, a pressure gauge of the present invention comprises a body 1, an inlet duct 2, an outlet duct 3, and a needle-style pressure meter 4, in which the body 1 is composed of an inlet 11, an outlet 12, a shunt hole 13; the inlet duct 2 is screw-locked to the inlet 11 of the body 1 and provided with a check valve 21 adjacent to the entrance; the outlet duct 3 is thread-locked on the outlet 12 of the body 1 and combined at one end thereof with an outlet 31 of an air-charging inlet of an object subject to inflation (as the air-charging inlet 8 of wheel tire indicated in FIG. 9); and the needle-style pressure meter 4 is combined with the shunt hole 13 by means of thread-locking. Since architecture of the needle-style pressure meter 4 is a known convenient art, thus, it will not be reiterated herein.

Figure 3A:
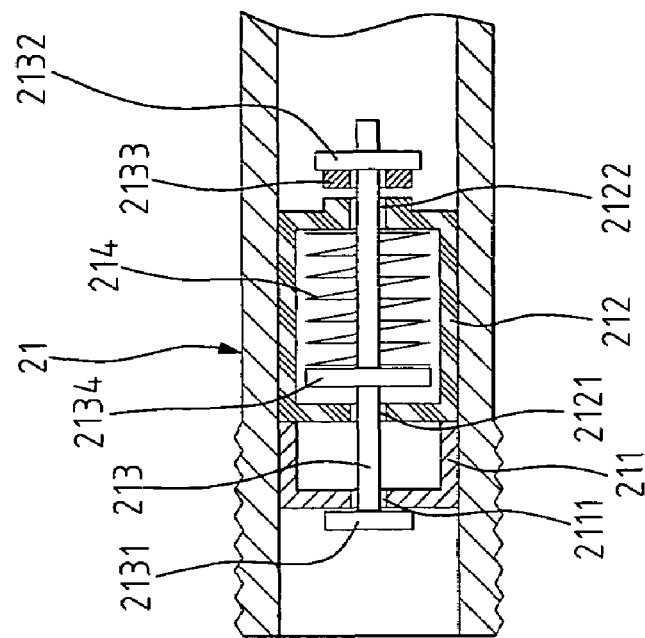
FIG. 3A shows the operation of the device of FIG. 3.
Figure 3:
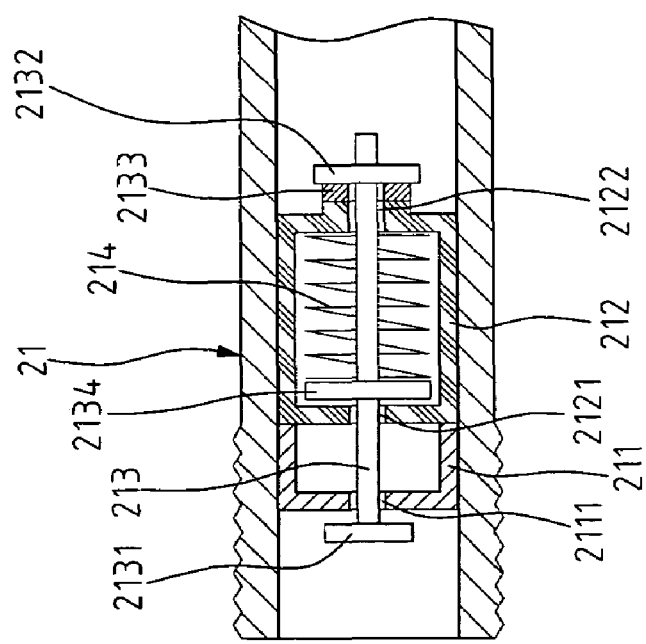
FIG. 3 is a sectional plane view of a check valve of the present invention arranged at an outlet.

As shown in FIG. 3, the check valve 21 further comprises a first cavity 211 and a second cavity 212 connected therewith, in which a first through hole 2111 is defined at the first cavity 211, a third through hole 2122 is defined at the second cavity 212, and a second through hole 2121 is defined between the first and the second cavity 211, 212, where the first through hole 2111, the second through hole 2121, and the third through hole 2122 are aligned in a straight line, and a shaft 213 is arranged penetrating the through holes 2111, 2121, 2122. Moreover, in two ends of the shaft 213, a first flange 2131, corresponding to the first through hole 2111, is formed at one end, and a valve 2132, corresponding to the third through hole 2122, is formed at the other, where the valve 2132 is coupled with a leakage-proof washer 2133. Besides, a second flange 2134 is formed on the shaft 213 at a position inside the second cavity 212, and a spring 214 is sheathed surrounding the shaft 213 in the space between the second flange 2134 and an inner wall of the second cavity 212. Under the situation the shaft 213 is suffering no external force, the spring 214 is supposed to push the second flange 2134 by means of the elastic force thereof to hence drive the valve 2132 together with the leakage-proof washer 2133 to choke the third through hole 2122 such that the air inside an inflated object is prevented from being discharged. On the contrary, as shown in FIG. 3A, when an external force is applied onto the first flange 2131 to push the shaft 213 to move axially and further overcome the elastic force of the spring 214, then, the valve 2132 together with the leakage-proof washer 2133 are forced to depart from the third through hole 2122 such that the choke is removed and the air inside the inflated object can be discharged through the through holes 2122, 2121, and 2111.

Figure 4:
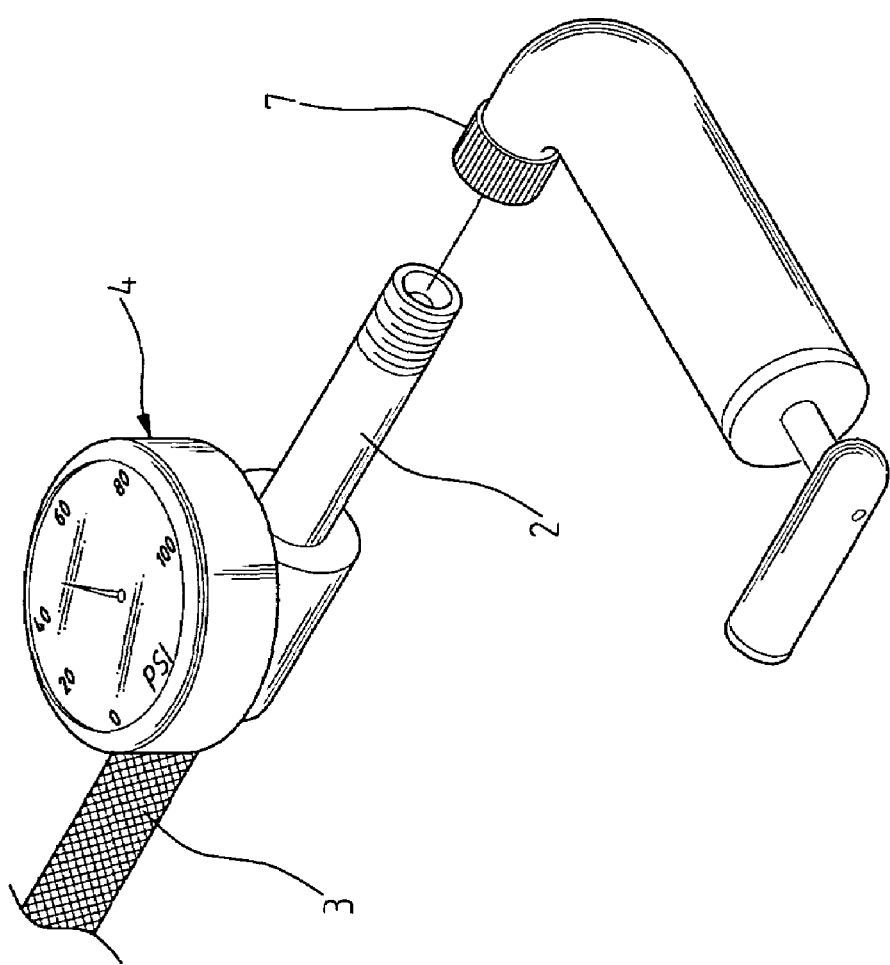
FIG. 4 is a local perspective view showing the combination relations between an air-charge inlet of inflation cylinder and an inlet duct of the present invention.
Figure 5:
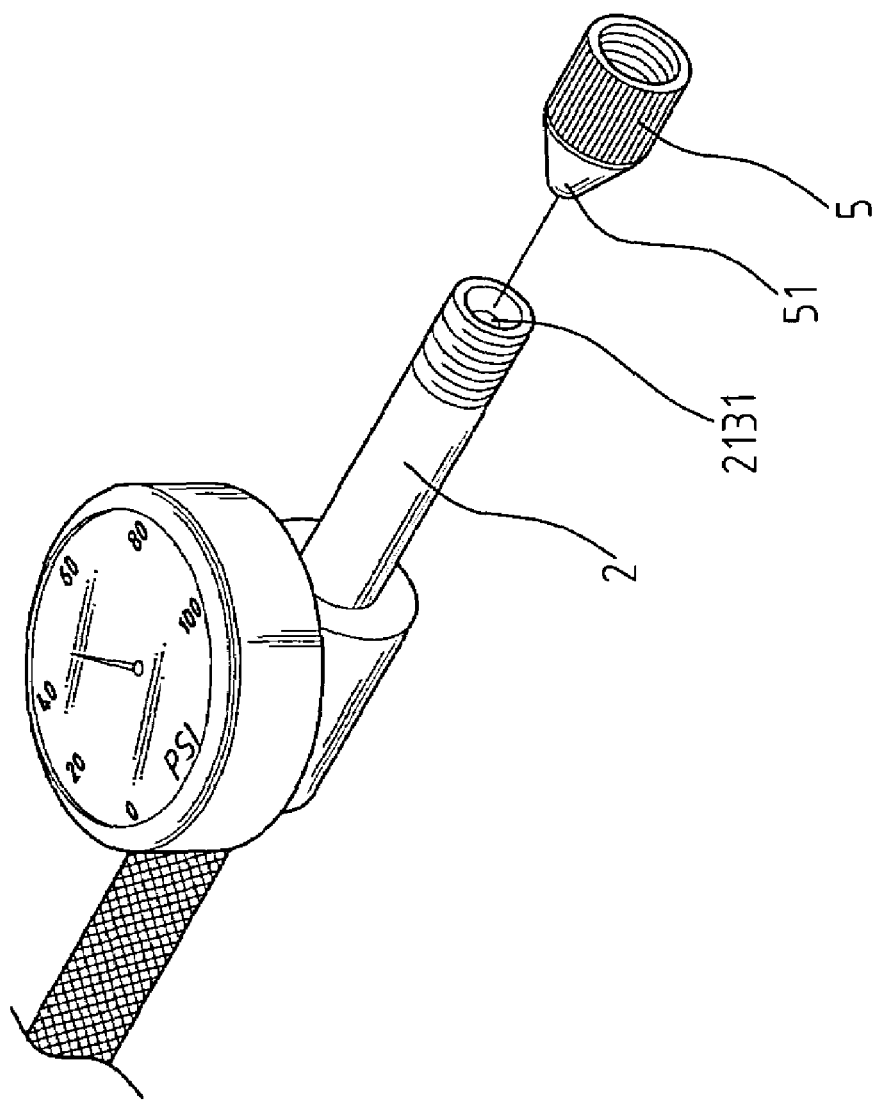
FIG. 5 is an embodiment's perspective view showing a pointing end of dust cover that serves as a pressure-discharge tool for the present invention.

The inlet duct 2 is formed of an outer surface thread for engaging with an inflation mouth 7 (shown in FIG. 4), or, alternatively, with a dust cover 5 having a pointing end 51 (shown in FIG. 5), so that the dust cover 5 can be locked to the inlet duct 2 during out of use, or the pointing end 51 of the dust cover 5 could be forced into the inlet duct 2 to push the first flange 2131 and open the check valve for discharging air and decreasing inside pressure, accordingly.

Figure 6:
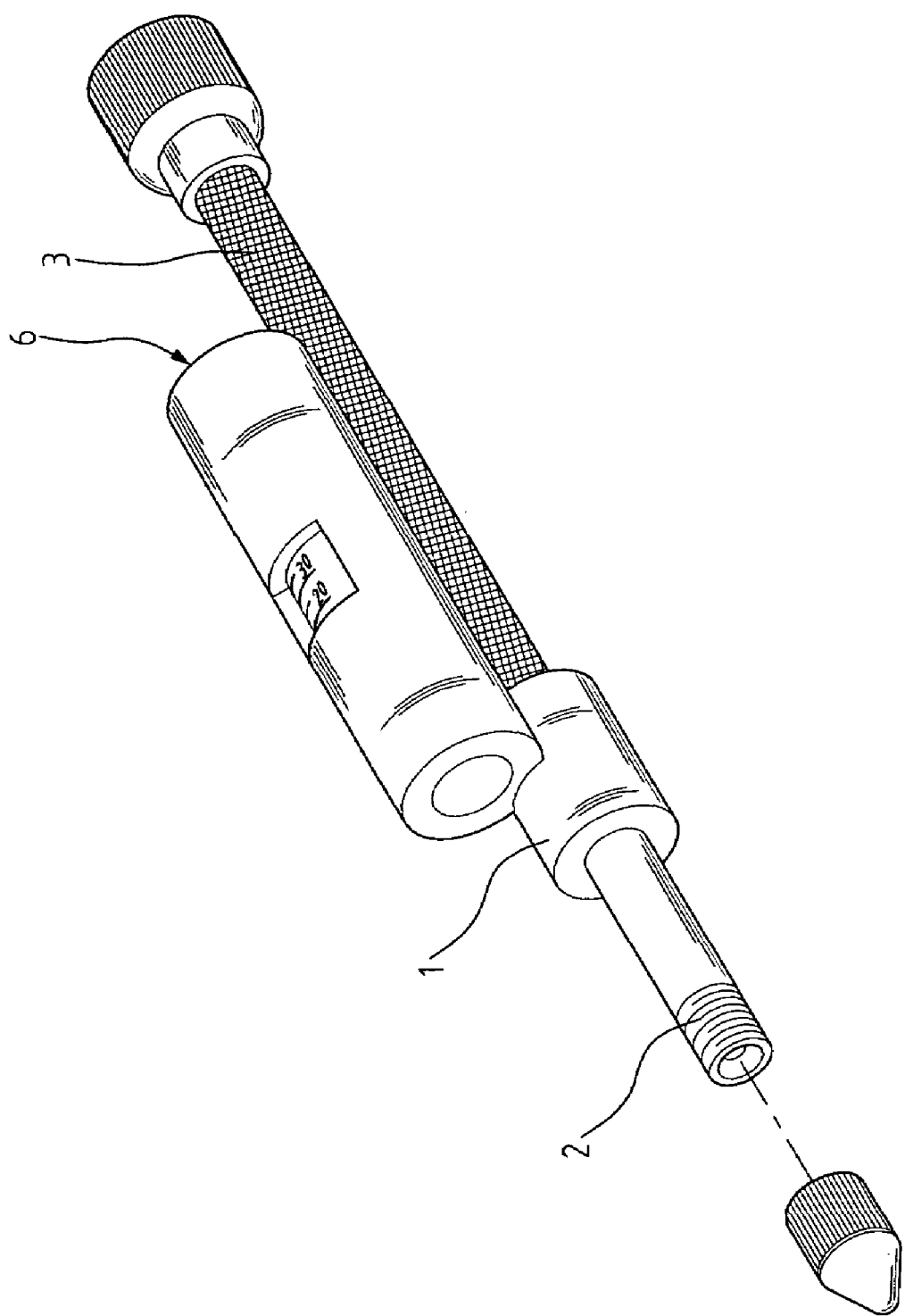
FIG. 6 is a perspective view of a second embodiment of the present invention.
Figure 7:
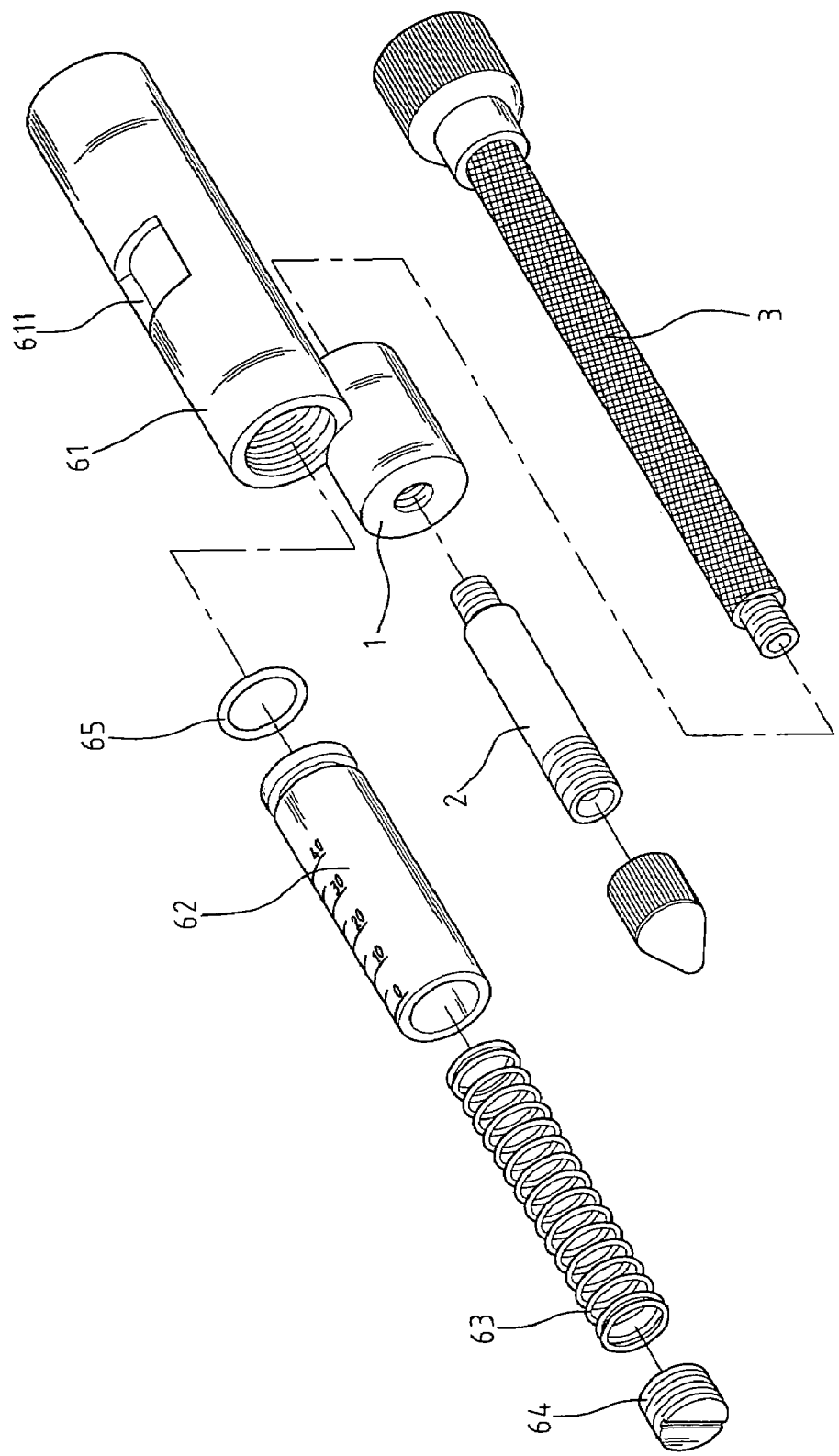
FIG. 7 is an exploded view of main elements of the second embodiment of the present invention.
Figure 8:
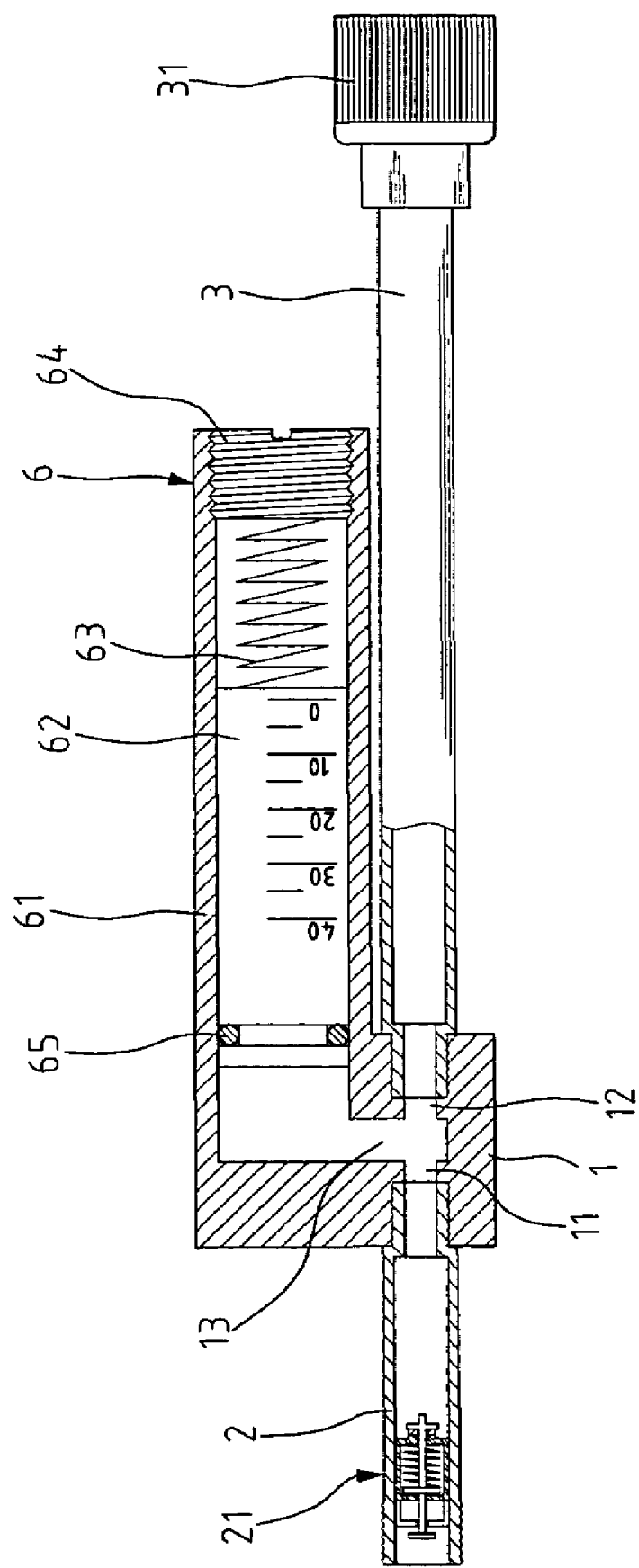
FIG. 8 is a cutaway sectional plane view of the second embodiment of the present invention.

In a second embodiment shown in FIGS. 6 and 8, a pressure gauge of the present invention is comprised of a body 1, an inlet duct 2, an outlet duct 3, and an upright cylinder-style pressure meter 6, in which the body 1 is composed of an intake 11, an outlet 12, a shunt hole 13; the inlet duct 2 is screw-locked to the intake 11 of the body 1 and provided with a check valve 21 adjacent to the entrance; the outlet duct 3 is thread-locked on the outlet 12 of the body 1 and combined at one end thereof with an outlet 31 of an air-charging inlet of an object subject to inflation; and the upright cylinder-style pressure meter 6 is further composed of a cylindrical body 61, a piston cylinder 62, a spring 63, and a cock 64, in which the cylindrical body 61 has a window 611 as well as a through hole in connection with the shunt hole 13 of the body 1 such that the cylindrical body 61 can communicate with the body 1; scales of pressure value are marked and a leakage-stopping ring 65 is disposed on the surface of the piston cylinder 62; and, after the spring 63 and the piston cylinder 62 have been placed in the cylindrical body 61 through a reserved opening on one side of the cylindrical body 61, the cock 64 is applied to seal the opening so that the spring 63 in left in the space between the piston cylinder 62 and the cock 64. The pressure gauge of the present invention is operated to charge air into the body 1 to rush into the outlet duct 3 through the inlet duct 2 and meanwhile into the cylindrical body 61 to hence push the piston cylinder 62 to display a real-time pressure value.

In the above described, at least one preferred embodiment has been described in detail with reference to the drawings annexed, and it is apparent that numerous changes or modifications may be made without departing from the true spirit and scope thereof, as set forth in the claims below.

What is claimed is:

1. A pressure gauge, comprising:
   a body having an inlet, an outlet, and a shunt hole;
   a pressure meter assembled to the shunt hole;
   an inlet duct provided with a check valve, being assembled to the inlet of the body; and
   an outlet duct provided with an outlet, being assembled to the outlet of the body;
   wherein the check valve comprises a first cavity and a connected second cavity, the first cavity having a first through hole, the second cavity having a third through hole, a second through hole being defined between the first and second cavities, the first, second, and third through holes being aligned in a straight line, a shaft extending through the first, second, and third through holes, the shaft having opposite ends respectively forming a first flange corresponding in position to the first through hole and a valve corresponding in position to the third through hole, the shaft forming a second flange positioned in the second cavity, a spring arranged being the second flange and an inner wall surface of the second cavity.

2. The pressure gauge as claimed in claim 1, wherein the pressure meter is a needle-style pressure meter.

3. The pressure gauge as claimed in claim 1, wherein the pressure meter is an upright cylinder-style pressure meter.

4. The pressure gauge as claimed in claim 3, wherein the upright cylinder-style pressure meter comprises:
   a cylindrical body having a window and a through hole, the through hole being in communication with the shunt hole of the body;
   a spring disposed in the cylindrical body; and
   a piston cylinder, being marked with pressure scales on the surface thereof and provided with a leakage-stopping ring along the circumference thereof and located in the cylindrical body such that the spring is disposed between the piston cylinder and one end of the cylindrical body.

5. The pressure gauge as claimed in claim 1 further comprising a dust cover mounted to the inlet duct, the dust cover having a pointed outer end.

* * * * *